(12) United States Patent
Manes et al.

(10) Patent No.: US 6,208,483 B1
(45) Date of Patent: Mar. 27, 2001

(54) GRIPPER-POSITIONING COMPONENT FOR STORAGE LIBRARY SYSTEM

(75) Inventors: Joseph P. Manes, Arvada; David C. Black, Thornton, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/213,005

(22) Filed: Dec. 16, 1998

(51) Int. Cl.$^7$ .................................................. G11B 15/68
(52) U.S. Cl. ............................................................ 360/92
(58) Field of Search .................................. 360/92, 99.02, 360/99.06; 369/36, 75.1, 77.1, 77.2, 178, 191, 192; 414/277, 280, 751, 753

(56) References Cited

U.S. PATENT DOCUMENTS

| | | |
|---|---|---|
| 5,054,836 | 10/1991 | Schulz . |
| 5,101,388 * | 3/1992 | Fushimi ................................. 369/36 |
| 5,144,506 * | 9/1992 | Sahota ................................... 360/92 |
| 5,253,911 | 10/1993 | Egan et al. . |
| 5,469,310 * | 11/1995 | Slocum et al. ........................ 360/92 |
| 5,588,796 | 12/1996 | Ricco et al. . |
| 5,601,391 | 2/1997 | Gazza . |
| 5,659,434 | 8/1997 | Yamakawa et al. . |
| 5,691,859 * | 11/1997 | Ulrich et al. ......................... 360/92 |
| 5,774,301 * | 6/1998 | Manes et al. ........................ 360/92 |
| 5,848,872 | 12/1998 | Manes et al. ........................ 414/753 |
| 5,914,831 * | 6/1999 | Lass et al. .......................... 360/96.5 |
| 5,966,266 | 10/1999 | Kato et al. . |
| 5,973,876 * | 10/1999 | Yeakley et al. ....................... 360/92 |
| 6,040,956 * | 3/2000 | Utsumi ................................. 360/92 |

FOREIGN PATENT DOCUMENTS

| | | |
|---|---|---|
| 0 834 382 A2 | 4/1998 | (EP) . |
| 1-182957 | 10/1989 | (JP) . |
| 10-188416 | 10/1998 | (JP) . |

OTHER PUBLICATIONS

International Search Report—Apr. 13, 2000.

* cited by examiner

Primary Examiner—David L. Ometz
(74) Attorney, Agent, or Firm—Brooks & Kushman P.C.

(57) ABSTRACT

Some storage library systems use servo motors to control positioning of the hand assembly for removal of an ejected cartridge from a tape drive. This and other methods of positioning the hand assembly may be inaccurate or time consuming, and may inadvertently result in pushing the cartridge too far into the tape drive. The present invention provides a storage library system including a tape drive for receiving, reading and ejecting cartridges, wherein the tape drive has a front face. A locator plate is attached to the front face. The locator plate has a stall limit surface. A robotically-movable hand assembly is operative to retrieve ejected cartridges from the tape drive. The robotically-movable hand assembly includes a stall limit feature protruding therefrom for abutting against the stall limit surface to limit movement of the hand assembly toward the tape drive to properly space the hand assembly with respect to the tape drive for removing cartridges from the tape drive. Additionally, the hand assembly includes a z-limit feature and the locator plate includes a z-locator feature which is engageable with the z-limit feature to properly locate the hand assembly vertically with respect to the tape drive.

7 Claims, 7 Drawing Sheets

GRIPPER-POSITIONING COMPONENT FOR STORAGE LIBRARY SYSTEM

TECHNICAL FIELD

The present invention relates to a gripper positioning component for a storage library system for properly locating a robotically-movable hand assembly, including a gripper, with respect to a tape drive in order to retrieve an ejected cassette from the tape drive.

BACKGROUND ART

Storage library systems are used for storage and retrieval of data stored on cartridges. A storage library system may include multiple tape drives, and a robotically-movable hand assembly including a gripper for grasping and removing ejected cartridges from the various tape drives.

Certain tape drives eject cartridges to specific distances and are sensitive to push-back forces or push-back distances. If the ejected cartridge is pushed back into the tape drive with a certain force or to a certain distance, the tape drive will reload the cartridge. Accordingly, this reloading may occur if a movable hand assembly bumps against an ejected cartridge or pushes the cartridge too far into the tape drive prior to grasping the cartridge for removal. Speed is a critical feature of storage library systems, however, in this situation, a substantial time delay is caused because the cartridge must again be ejected from the tape drive for retrieval of the cartridge.

Bumping of the cartridge by the gripper of the hand assembly may occur if the hand assembly is not in the proper vertical position or not in the proper horizontal position for grasping the cartridge. The hand assembly is typically at the end of a multi-arm structure, therefore tolerance stack-up of the various arms may cause the end of the hand assembly to be out of position.

Some tape drives use mechanical hooks to hold the tape cartridge in the proper position in case the hand assembly bumps against the cartridge or attempts to push the cartridge in too far prior to removal. These mechanical hooks add a certain cost and reliability penalty to the storage library system.

Some prior art systems use servo position controllers to limit the movement of the hand assembly. This substantially slows the performance of the library and requires very narrow manufacturing tolerances between the drive and gripping device in order to operate properly.

Therefore, it is desirable to provide an inexpensive and accurate method and apparatus for properly positioning a hand assembly with the respect to a tape drive in order to retrieve an ejected cartridge from a tape drive without forcing the cartridge too far into the tape drive.

BRIEF SUMMARY OF THE INVENTION

The present invention overcomes the above-referenced shortcomings of the prior art storage library systems by providing a stall position component on the face of a tape drive so that the hand assembly abuts against the stall position component to properly position the hand assembly for grasping the cartridge without forcing the cartridge too far into the tape drive. This component will absorb the reach forces and limit depth the cartridge can be pushed back into the tape drive.

More specifically, the present invention provides a storage library system including a tape drive for receiving, reading and ejecting cartridges, wherein the tape drive has a front face, and a locator plate is attached to the front face. The locator plate includes a stall limit surface. A robotically-movable hand assembly is operative to retrieve cartridges from the tape drive. The robotically-movable hand assembly includes a stall limit feature protruding therefrom for abutting against the stall limit surface to limit movement of the hand assembly toward the tape drive to properly space the hand assembly with respect to the tape drive for retrieving cartridges from the tape drive.

Another aspect of the invention provides a method of removing an ejected cartridge from a tape drive having a front face by manipulation of a robotically-movable hand assembly. The method includes the steps of: (a) providing a locator plate on the front face, wherein the locator plate has a stall limit surface; (b) providing a stall limit feature protruding from the hand assembly; (c) moving the hand assembly toward the tape drive until the stall limit feature abuts against the stall limit surface to prevent further movement, thereby properly spacing the hand assembly from the tape drive; and (d) manipulating the hand assembly to remove the ejected cartridge from the tape drive.

Accordingly, an object of the invention is to provide an inexpensive and accurate method and apparatus for properly positioning a hand assembly with respect to a tape drive for removing an ejected cartridge from the tape drive while limiting the depth that the cartridge may be pushed back into the tape drive.

The above object and other objects, features and advantages of the present invention are readily apparent from the following detailed description of the best mode for carrying out the invention when taken in connection with the accompanying drawings.

DETAILED DESCRIPTION OF THE INVENTION

Figure 1:
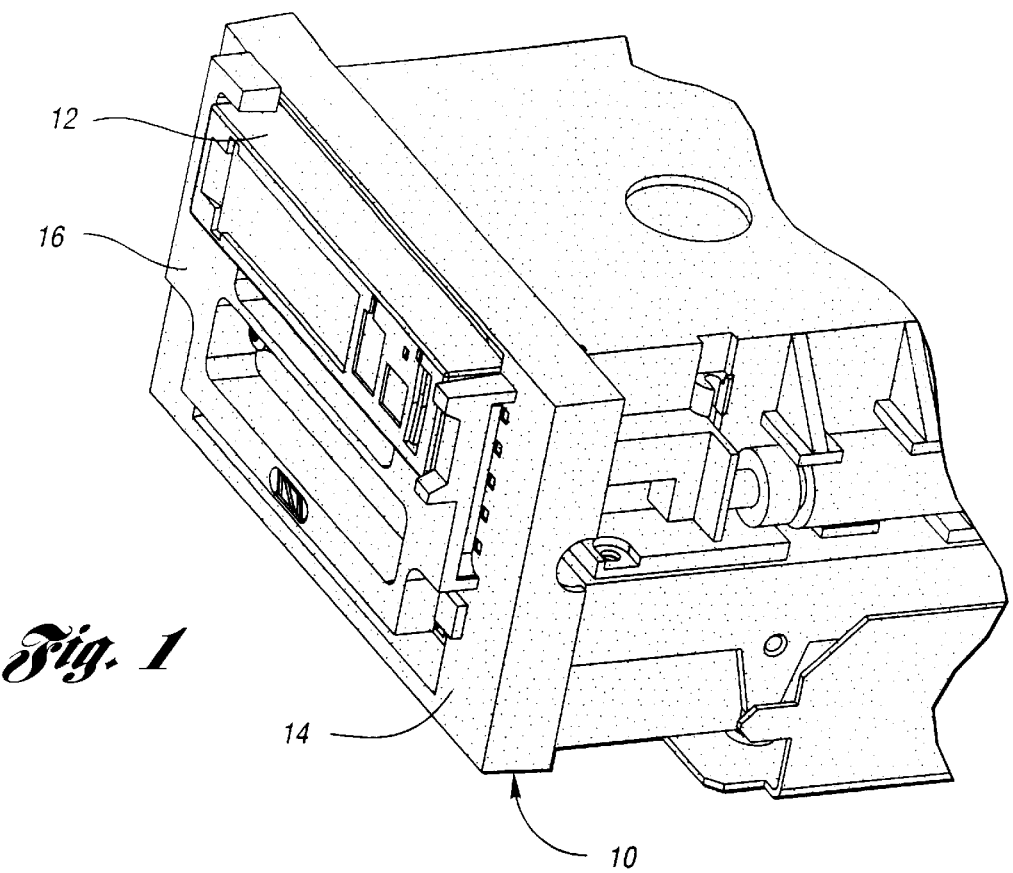
FIG. 1 shows a perspective view of a tape drive with an ejected cartridge.
Figure 2:
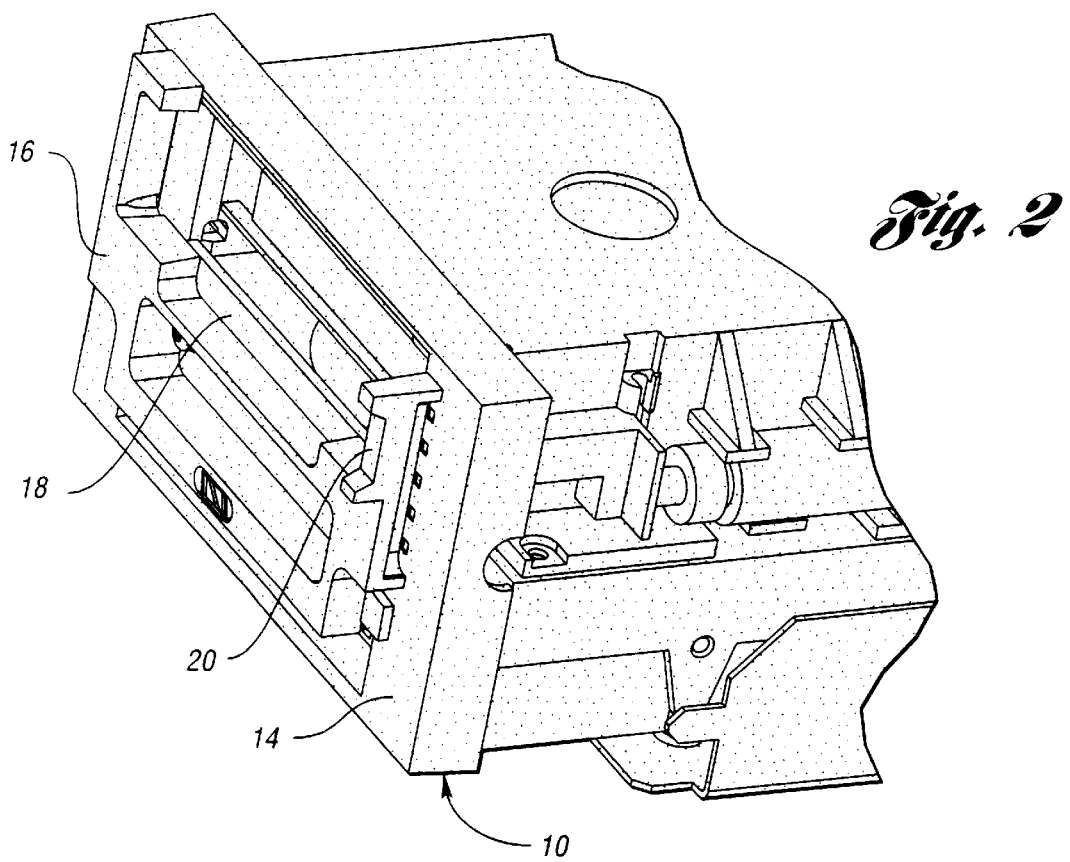
FIG. 2 shows a perspective view of the tape drive of FIG. 1.

Referring to FIGS. 1 and 2, a tape drive 10 is shown in accordance with the present invention. The tape drive 10 is operative to receive, read or write, and eject cartridges, such as the cartridge 12 in a storage library system. The tape drive 10 includes a front face 14. A locator plate 16 is attached to the front face 14.

Figure 9:
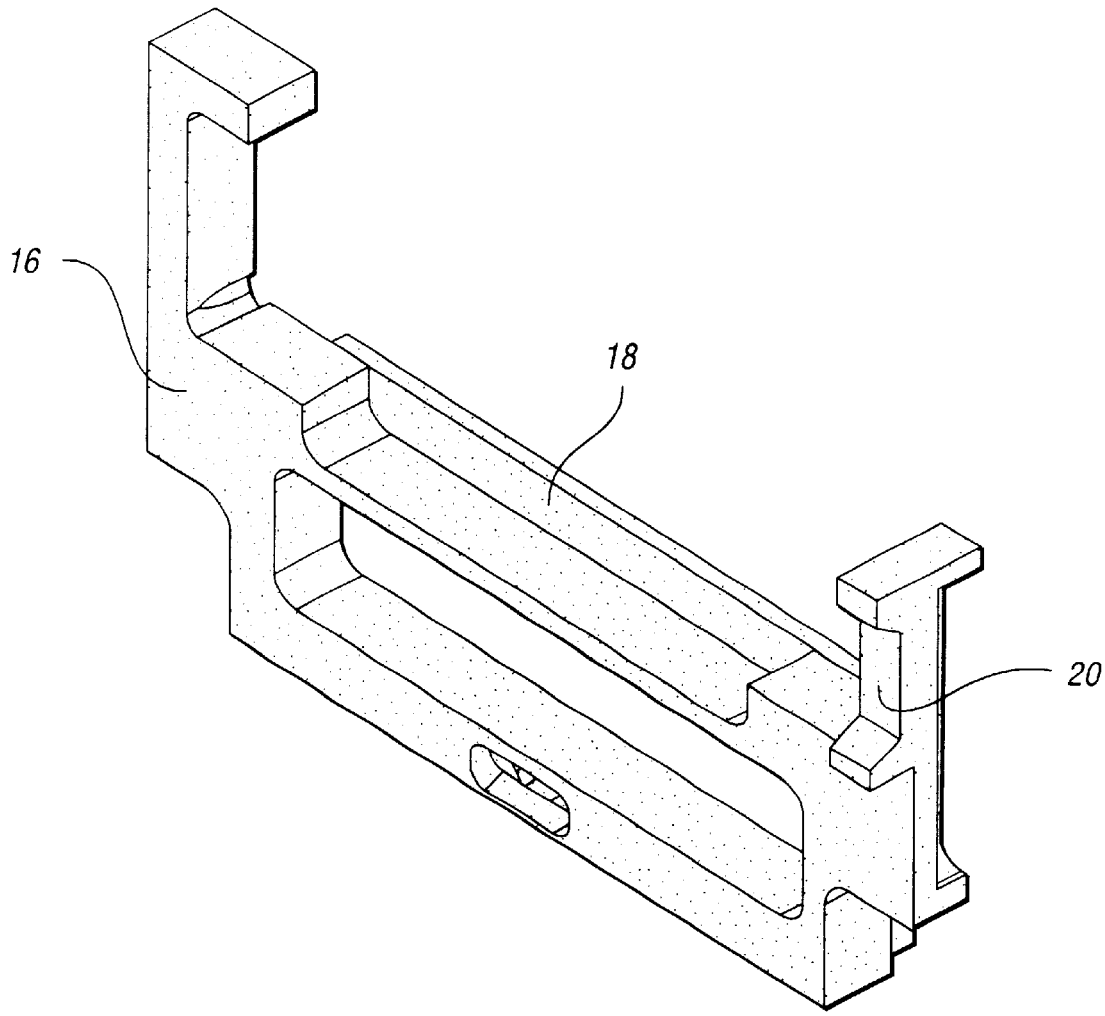
FIG. 9 shows a perspective view of the location plate shown in FIGS. 1–8.

The locator plate includes a stall limit surface 18 and a z-locator feature 20 which are operative to properly locate the robotically-movable hand assembly 22, shown in FIG. 3, with respect to the tape drive 10 for removing the cartridge 12 from the tape drive 10, as described below. The locator plate 16 is preferably an injection molded component to provide resilience for absorbing impact energy when the hand assembly 22 collides with the locator plate 16, which is more clearly shown in FIG. 9.

Figure 3:
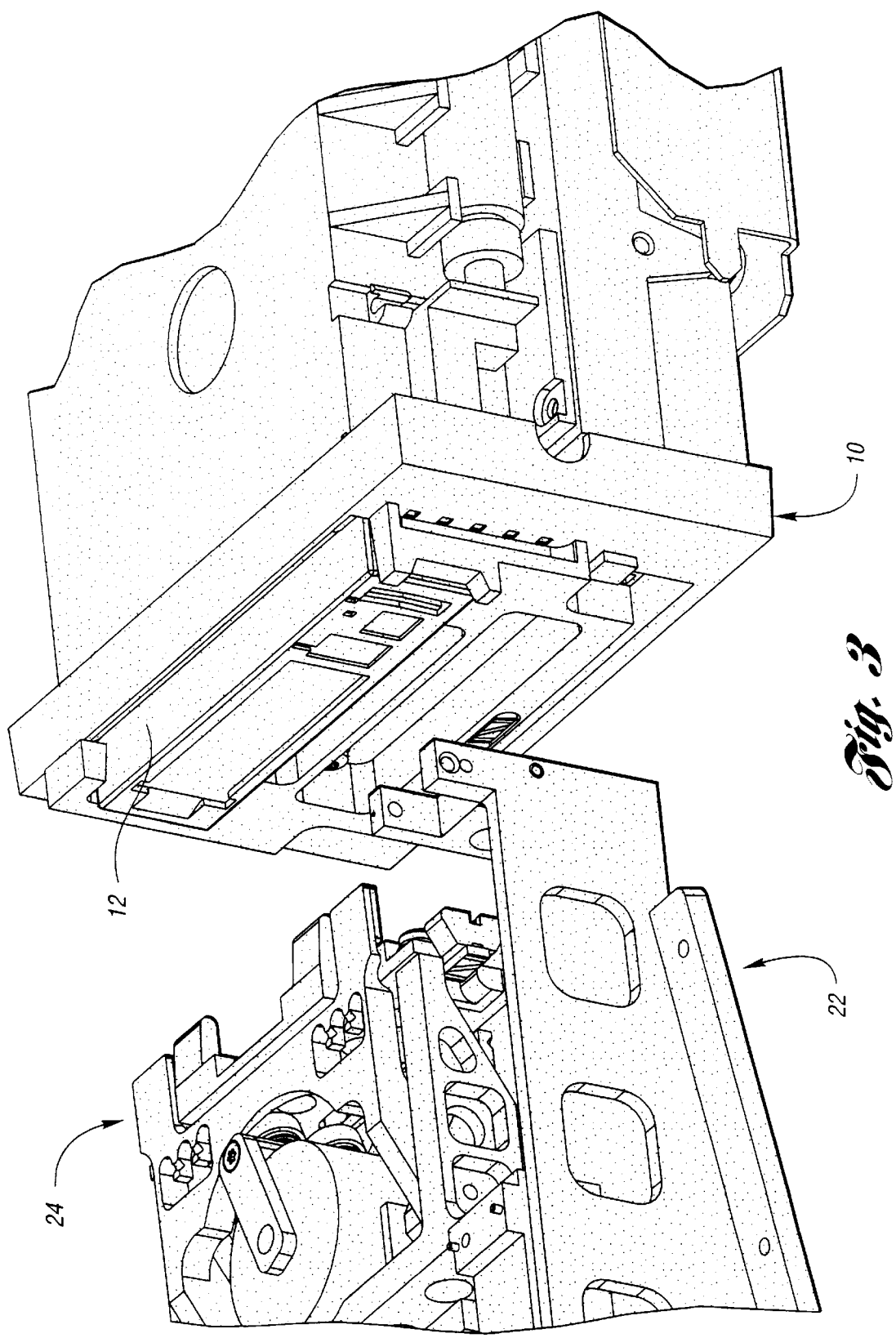
FIG. 3 shows a perspective view of the tape drive of FIG. 1 with a hand assembly approaching the tape drive.
Figure 4:
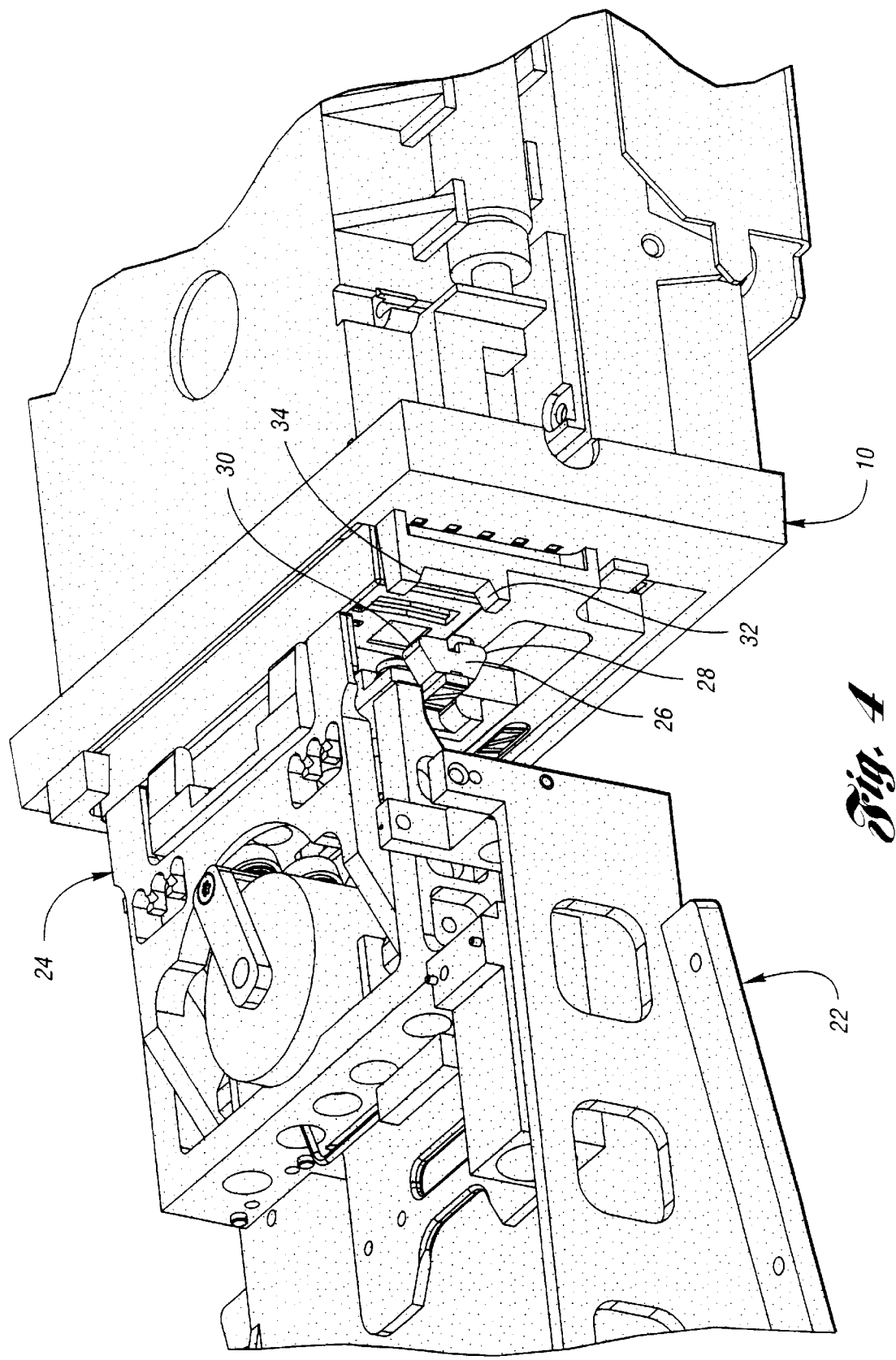
FIG. 4 shows a perspective view of the tape drive and hand assembly of FIG. 3 with the gripper assembly approaching the cartridge.
Figure 5:
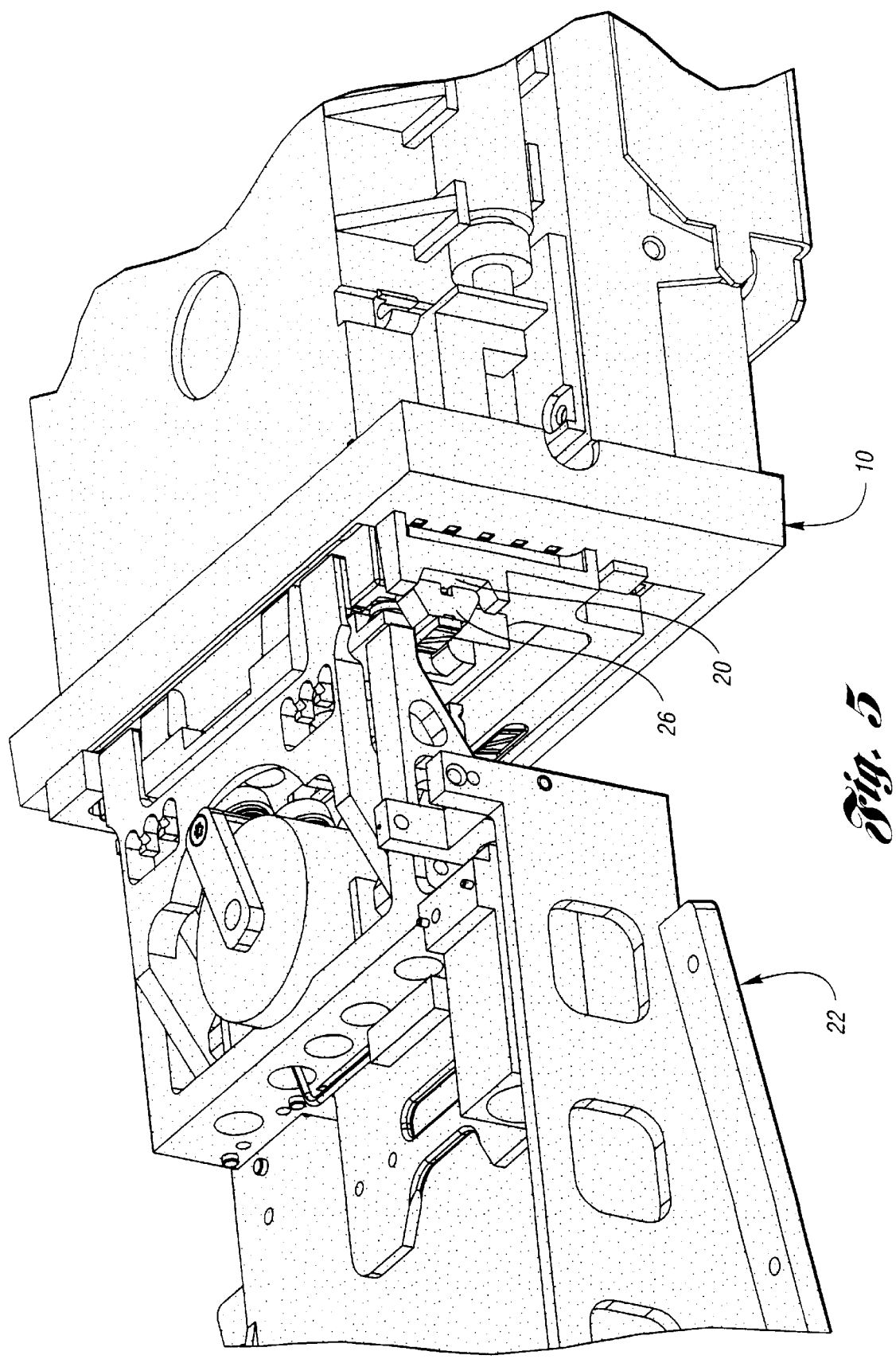
FIG. 5 shows a perspective view of the tape drive and hand assembly of FIG. 4 with the gripper assembly grasping the cartridge.

As shown in FIGS. 3–5, the hand assembly 22 approaches the tape drive 10, and as shown in FIG. 4, the gripper 24 is extended from the hand assembly 22 for cartridge retrieval. The gripper 24 includes a z-limit feature 26 having rounded ends 28,30. As the hand assembly 22 and gripper 24 approach the tape drive 10, the z-limit feature 26 engages the z-locator feature 20 to properly position the gripper 24 vertically with respect to the tape drive 10. As shown in FIG. 4, the z-locator feature 20 includes opposing sloped arms 32,34 which engage the respective rounded ends 28,30 of the z-limit feature 26 for properly positioning the hand assembly 22 vertically with respect to the tape drive 10.

Figure 7:
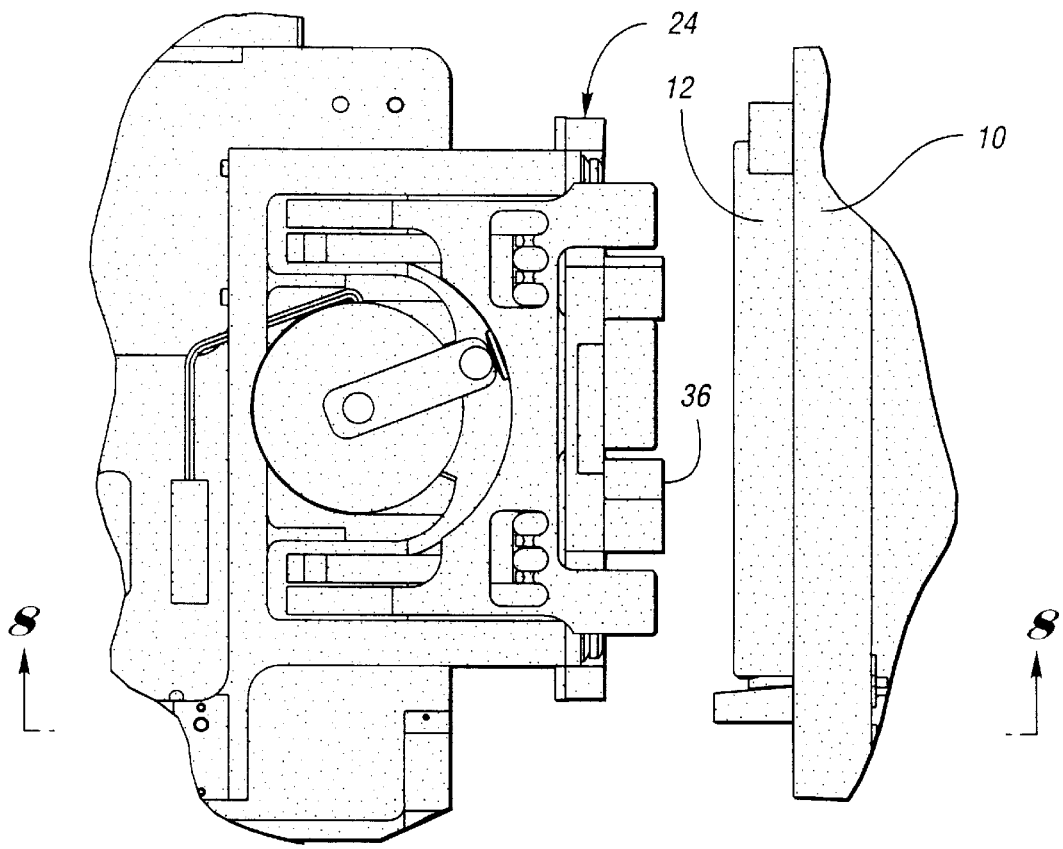
FIG. 7 shows a cut-away plan view of the hand assembly and tape drive of FIGS. 3–6.
Figure 8:
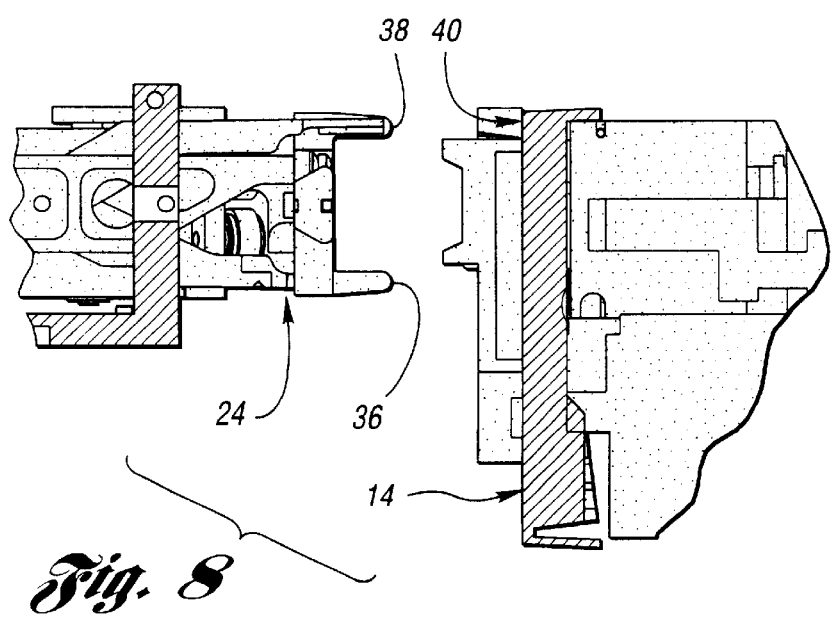
FIG. 8 shows a sectional view taken at line 8—8 of FIG. 7.

Referring to FIGS. 7 and 8, the gripper 24 also includes a stall limit feature 36 protruding therefrom. The stall limit feature 36 is operative to abut against the stall limit surface 18 of the locator plate 16, shown in FIG. 2, to limit movement of the hand assembly 22 toward the tape drive 10 to properly space the hand assembly 22 from the front face 14 of the tape drive 10 for removing the cartridge 12 from the tape drive 10. Additionally, referring to FIG. 8, the second stall limit feature 38 is abutted against the top portion 40 of the front face 14 of the tape drive 10 to further limit movement of the hand assembly 22 toward the tape drive 10.

The present invention contemplates that various other stall limit features may be provided for stalling the movement of the hand assembly against the tape drive for properly positioning the gripper with respect to the cartridge being retrieved from the tape drive. For example, a stall limit feature may protrude from the hand assembly with a rubber bumper for engagement directly against the tape drive, thereby eliminating the locator plate 16.

Figure 6:
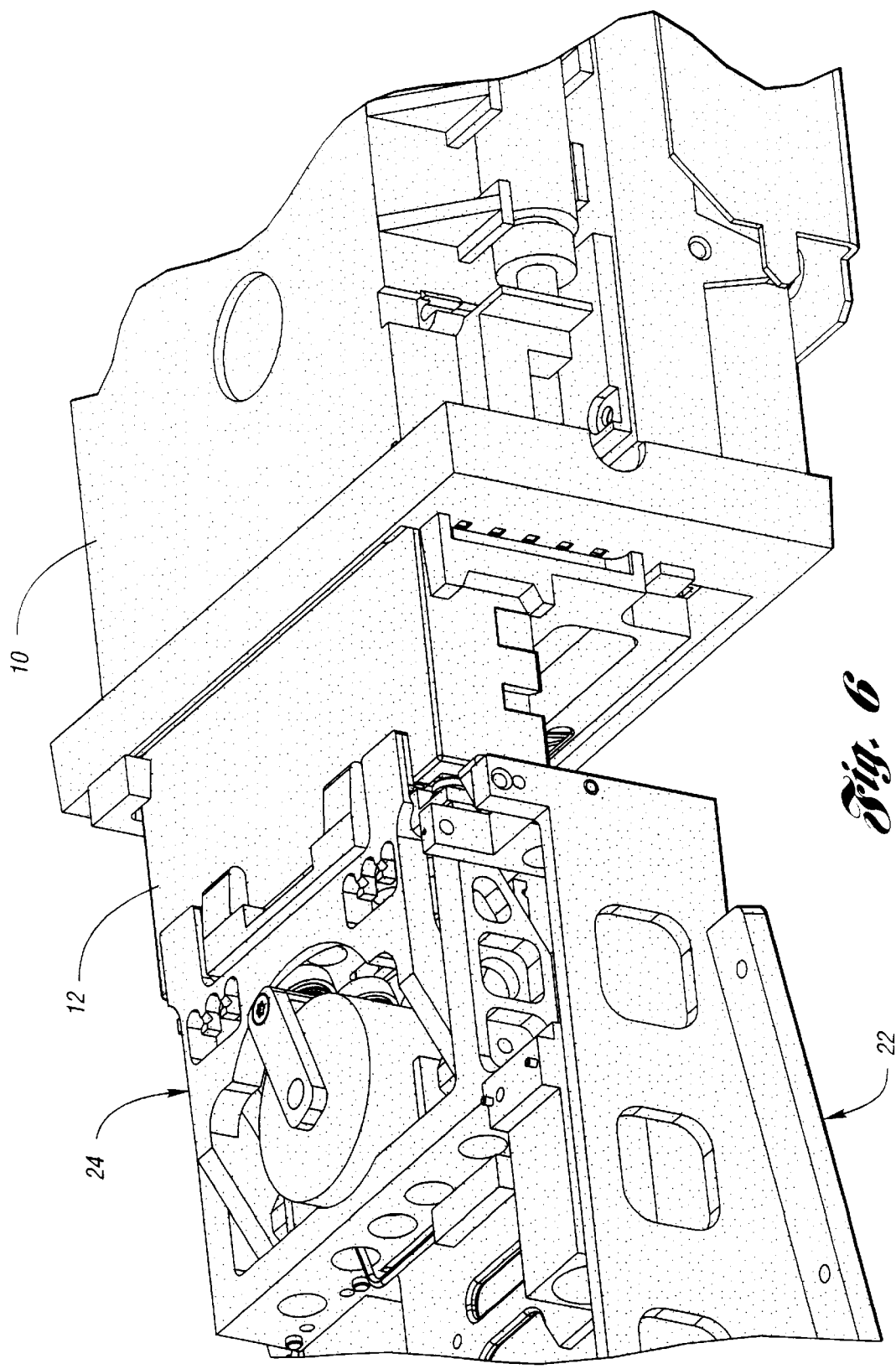
FIG. 6 shows a perspective view of the tape drive and hand assembly of FIG. 5 with the gripper removing the cartridge from the tape drive.

Referring to FIG. 6, the cartridge 12 is shown being removed from the tape drive 10 by the gripper 24 of the hand assembly 22.

The invention also provides a method of removing an ejected cartridge from a tape drive having a front face by manipulation of a robotically-movable hand assembly. The method includes the steps of: (a) providing a locator plate on the front face wherein the locator plate has a stall limit surface; (b) providing a stall limit feature protruding from the hand assembly; (c) moving the hand assembly toward the tape drive until the stall limit feature abuts against the stall limit surface to prevent further movement, thereby properly spacing the hand assembly from the tape drive; and (d) manipulating the hand assembly to remove the ejected cartridge from the tape drive.

While the best mode for carrying out the invention has been described in detail, those familiar with the art to which this invention relates will recognize various alternative designs and embodiments for practicing the invention within the scope of the appended claims.

What is claimed is:

1. A storage library system, comprising:

a tape drive for receiving, reading and ejecting cartridges, said tape drive having a front face;

a locator plate non-movably attached to said front face, said locator plate having a stall limit surface; and a robotically-movable hand assembly operative to retrieve ejected cartridges from the tape drive;

wherein said robotically-movable hand assembly includes a stall limit feature protruding therefrom for abutting against the stall limit surface to limit movement of the hand assembly toward the tape drive to properly space the hand assembly with respect to the tape drive for removing said cartridges from the tape drive.

2. The storage library system of claim 1, wherein said locator plate further comprises a z-locator feature and said hand assembly further comprises a z-limit feature to properly locate the hand assembly vertically with respect to the tape drive for removing said cartridges from the tape drive.

3. The storage library system of claim 2, wherein said z-locator feature comprises opposing sloped arms forming substantially a v-shape for vertically guiding the z-limit feature as the hand assembly is moved toward the tape drive.

4. A method of removing an ejected cartridge from a tape drive having a front face by manipulation of a robotically-movable hand assembly, the method comprising:

providing a locator plate non-movably mounted on said front face, wherein the locator plate has a stall limit surface;

providing a stall limit feature protruding from the hand assembly;

moving the hand assembly toward the tape drive until the stall limit feature abuts against the stall limit surface to prevent further movement, thereby properly spacing the hand assembly from the tape drive; and manipulating the hand assembly to remove the ejected cartridge from the tape drive.

5. The method of claim 4, wherein said locator plate further comprises a z-locator feature and said hand assembly further comprises a z-limit feature protruding therefrom for engagement with the z-locator feature to properly locate the hand assembly vertically with respect to the tape drive for removing the ejected cartridge from the tape drive.

6. The method of claim 5, wherein said z-locator feature comprises opposing sloped arms forming substantially a v-shape for vertically guiding the z-limit feature as the hand assembly is moved toward the tape drive.

7. A storage library system, comprising:

a tape drive for receiving, reading and ejecting cartridges;

a robotically-movable hand assembly operative to retrieve ejected cartridges from the tape drive; and a locator component operatively connected to one of said tape drive and hand assembly for abutting against the other of the tape drive and hand assembly as the hand assembly moves toward the tape drive to limit movement of the hand assembly toward the tape drive to properly space the hand assembly with respect to the tape drive for removing the ejected cartridges from the tape drive, wherein said locator component comprises a stall limit feature protruding from the hand assembly, and the storage library system further comprises a locator plate non-movably attached to the tape drive, said locator plate having a stall limit surface for engagement with the stall limit feature.

* * * * *